(12) United States Patent
Sklovsky et al.

(10) Patent No.: US 8,060,012 B2
(45) Date of Patent: Nov. 15, 2011

(54) METHOD AND APPARATUS FOR AUTOMATIC NEAR FIELD COMMUNICATION APPLICATION SELECTION IN AN ELECTRONIC DEVICE

(75) Inventors: Vladimir Sklovsky, Vernon Hills, IL (US); Yan Bertrand, Toulouse (FR); Thomas Buhot, Toulouse (FR)

(73) Assignee: Motorola Mobility, Inc., Libertyville, IL (US)

( * ) Notice: Subject to any disclaimer, the term of this patent is extended or adjusted under 35 U.S.C. 154(b) by 471 days.

(21) Appl. No.: 12/398,057

(22) Filed: Mar. 4, 2009

(65) Prior Publication Data

US 2009/0247077 A1   Oct. 1, 2009

(30) Foreign Application Priority Data

Mar. 27, 2008   (EP) .................................... 08305072

(51) Int. Cl.
*H03B 5/00*   (2006.01)
(52) U.S. Cl. ...................................... 455/41.1; 455/41.2
(58) Field of Classification Search .................... None
See application file for complete search history.

(56) References Cited

U.S. PATENT DOCUMENTS

| | | | |
|---|---|---|---|
| 6,098,890 | A | 8/2000 | Kreft et al. |
| 6,852,031 | B1 | 2/2005 | Rowe |
| 7,549,590 | B2 | 6/2009 | Matsushita et al. |
| 7,797,537 | B2 * | 9/2010 | Kurita et al. ................. 713/169 |
| 2006/0109931 | A1 | 5/2006 | Asai et al. |
| 2006/0290496 | A1 | 12/2006 | Peeters |
| 2007/0131759 | A1 | 6/2007 | Cox et al. |
| 2007/0263596 | A1 | 11/2007 | Charrat |
| 2008/0011833 | A1 | 1/2008 | Saarisalo |
| 2008/0042807 | A1 | 2/2008 | Park et al. |
| 2009/0191812 | A1 * | 7/2009 | Teruyama et al. ............ 455/41.1 |
| 2009/0247078 | A1 * | 10/2009 | Sklovsky et al. ............. 455/41.1 |
| 2010/0222000 | A1 * | 9/2010 | Sauer et al. ................... 455/41.2 |

FOREIGN PATENT DOCUMENTS

| | | |
|---|---|---|
| EP | 1798867 A2 | 6/2007 |
| WO | WO-02/43019 | 5/2002 |
| WO | WO-2004/003801 | 1/2004 |
| WO | WO-2006/111782 | 10/2006 |

OTHER PUBLICATIONS

PCT Search Report, "Search Report and Written Opinion, Form PCT/ISA/220", *Corresponding PCT Application No. PCT/US2009/036448*, Filed Mar. 9, 2009.
PCT International Search Report, Oct. 19, 2009.
PCT Search Report, "Search Report and Written Opinion, Form PCT/ISA/220", *Corresponding PCT Application No. PCT/US2009/037607*, Filed Mar. 29, 2009, Mailed Nov. 4, 2009.

* cited by examiner

*Primary Examiner* — An Luu

(57) ABSTRACT

In a portable electronic device (100) having a plurality of near field communication applications stored within a plurality of execution environments, an application discovery manager (311) is configured to automatically select and launch one or more of the near field communication applications. A near field communication circuit (300) receives a near field communication request from an external near field communication device (700). The application discovery manager (311) identifies a near field communication technology, a protocol, and an application identifier and then references a registry table (313) to determine identification parameters corresponding with the identified information. The application discovery manager (311) then selects a near field communication application and launches it. The application discovery manager (311) further configures a routing switch (316) to direct data between the near field communication circuit controller (301) and the appropriate execution environment.

20 Claims, 11 Drawing Sheets

METHOD AND APPARATUS FOR AUTOMATIC NEAR FIELD COMMUNICATION APPLICATION SELECTION IN AN ELECTRONIC DEVICE

CROSS REFERENCE TO PRIOR APPLICATIONS

This application claims priority and benefit under 35 U.S.C. §119 from European Patent Office Application No. EP 08305072, filed Mar. 27, 2008, having the same title, which is incorporated by reference for all purposes.

BACKGROUND

1. Technical Field

This invention relates generally to electronic devices having near field communication circuitry and near field communication applications, and more particularly to a device having an application discovery manager capable of selecting one near field communication applications from many near field communication applications from near field communication device terminal identification characteristics.

2. Background Art

Mobile devices today are becoming increasingly complex. By way of example, a mobile telephone was used—not too long ago—only for making telephone calls. Today, however, some mobile telephones are equipped with near field communication technology, such as radio frequency identification (RFID) circuits, infrared communication circuits, and so forth. This near field communication technology can obtain information from other near field communication devices, deliver information to near field communication terminals, and even engage in financial transactions.

By way of example, when carrying a device equipped with near field communication technology, a person can use the device in place of traditional cards, currency, or tickets. For instance, "virtual cards" can be loaded into a "virtual wallet" within the device. A virtual wallet is simply an electronic application on the device that includes a virtual card software application. The virtual card software application hosts various virtual cards, which may include a credit card, a debit card, a public transportation pass, tickets to a play, and so forth. The virtual card application manages the virtual cards and permits user selection of the cards as well.

When a user approaches a near field communication terminal, such as a payment terminal at a restaurant or a ticket gate at the subway, the user manually selects a virtual card from the virtual wallet and waves the mobile device across the near field communication terminal. The mobile device then transmits the information wirelessly to the near field communication terminal via the near field communication circuitry. As such, the mobile device takes the place of a physical wallet.

In addition to being able to use virtual cards, portable electronic devices having near field communication technology are also capable of operating as near-field readers as well. A reader application within the electronic device is capable of reading external objects like RFID tags or smart posters. (A smart poster is a poster that includes a near-field communication tag capable of being read by the wireless near-field transceiver. A smart poster for a movie may include a near-field communication tag having information about show times, movie merchandise, and the like. When a user passes an electronic device having a wireless near-field communication circuit within a predetermined distance of such a poster, the device may read the information and present corresponding information on the display.)

The problem with all of these near field communication applications, including the many virtual cards, reader applications, and other applications, is that it can be cumbersome and difficult for the user to select the proper application for a particular near field communication device. For instance, a commuter carrying a briefcase and computer bag may not want to sift through a stack of application icons and menus in a mobile telephone to access a virtual subway card to be able to get on the subway. That same commuter would again not want to stumble through menus and icons to access a virtual identification card when he arrived at work. To further compound the problem, various near field communication terminals can use different technologies. This requires the user to alert the mobile device as to what type of technology a corresponding near field communication uses.

In short, the advent of near field communication technology in mobile devices offers users the ability to wirelessly communicate with a wide variety of near field communication technologies using a wide variety of near field communication applications. However, navigation among applications is time consuming and cumbersome. There is thus a need for a method and apparatus to facilitate automatic selection of a near field communication application without requiring the user to manually sift through lists of icons or menus.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
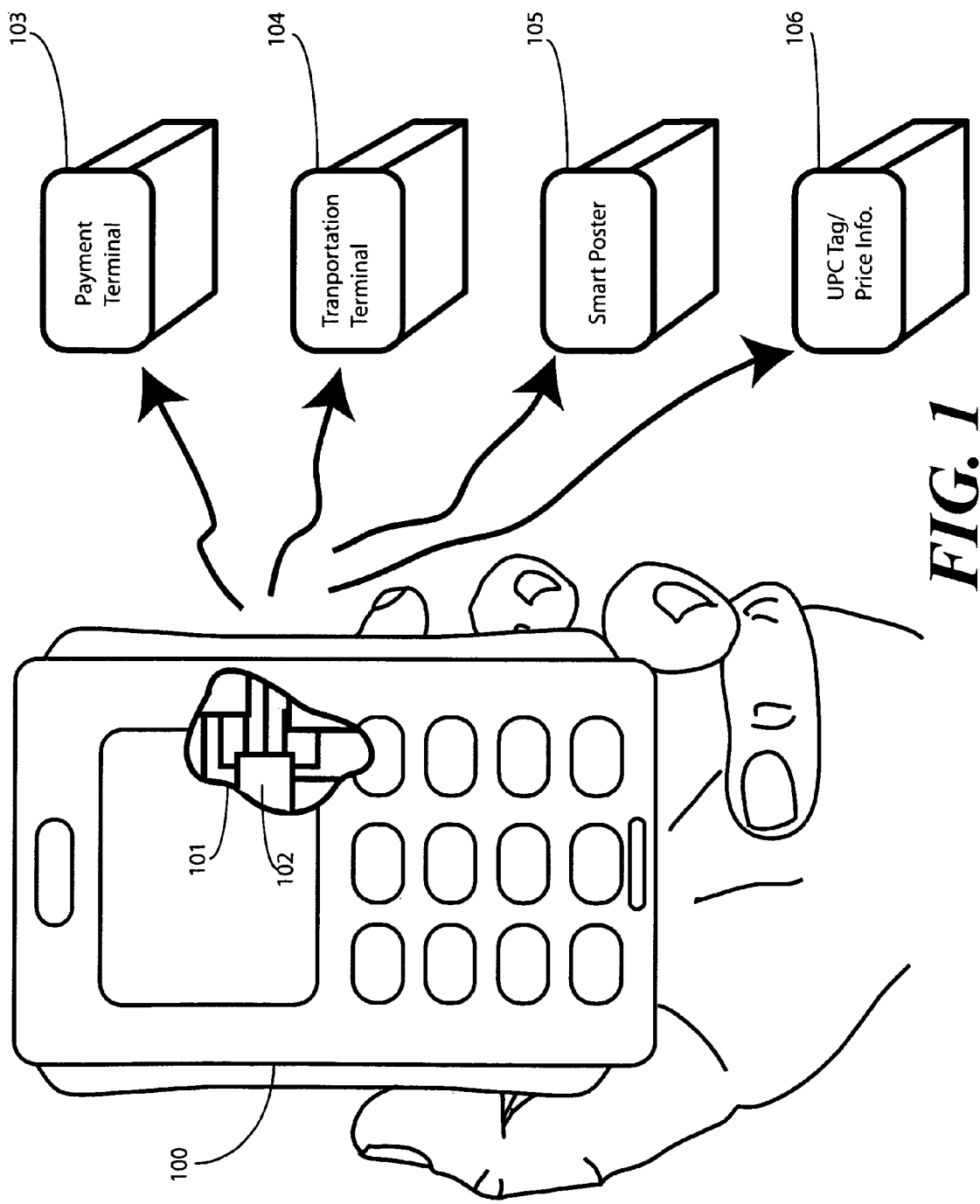
FIG. 1 illustrates a portable electronic device in accordance with embodiments of the invention communicating with various external near field communication devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an automatic selection of a near field communication application from a group of near field communication applications in an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the automatic selection of a near field communication application as described herein. The non-processor circuits may include, but are not limited to, a radio receiver, a radio transmitter, signal drivers, clock circuits, power source circuits, and user input devices. As such, these functions may be interpreted as steps of a method to perform the automatic selection of the near field communication application. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention include a method to automatically select and launch one or more near field communication applications in an electronic device having near field communication capabilities and a plurality of near field communication applications. In one embodiment, each of the near field communication applications is stored in one of several "execution environments." An execution environment, which can be a secure execution environment or "secure element", is a trusted execution environment for a near field communication application. These execution environments can come in a variety of form factors, including SIM cards, embedded memory devices, memory cards such as micro SD cards, and other similar devices.

When the portable electronic device comes within communication proximity of an external near field communication device, such as a payment terminal, smart poster, or other device, the portable electronic device engages in near field communication with the external device. During this communication, the portable electronic device can receive a communication request from the near field communication device. From this communication device request, the portable electronic device identifies the near field communication technology, the communication protocol, and an application identifier. The application identifier, in one embodiment, is a request for a particular type of near field communication application. For instance, if the near field communication device is a payment terminal, the application identifier may be for a financial transaction application, such as a credit or debit card. One suitable application for embodiments of the invention is that of automatically selecting cards from an electronic wallet.

After receiving the communication device request, an application discovery manager—running within the portable electronic device—references a registry table stored in memory. The registry table, which in one embodiment is downloaded from an application manager's table of enabled applications, includes identification parameters associated with the near field communication applications. For example, one application identifier would be the location of the execution environment in which the requested near field communication application resides. In one form or another, the identification parameters correspond to the near field communication device request. The identification parameters of the registry table can include parameters at different levels of the discovery process. For instance, the identification parameters can include parameters at the application level, the protocol level, or both.

Upon referencing the registry table for the identification parameters, the application discovery manger selects one of the near field communication applications and configures a routing switch such that the near field communication circuit controller can route data to the secure element or execution environment in which the selected near field communication application resides. The application discovery manager then launches the selected near field communication application and directs data communication from the near field communication device through a near field communication interface to execution environments associated with the at least on near field communication application.

The application discovery manager downloads its registry table from the application manager. The application manager maintains a table of all near field communication applications. The table may also include parameters used for enabling other components, such as a switch or the near field communication circuit controller, to route data to a particular execution environment.

So that a user may confirm that the proper near field communication selection has been chosen, the application discovery manager may optionally present the selected near field communication application to the user on a display. When the user confirms the selection by providing a selection signal from the user interface, the selected near field communication application is actuated by the application discovery manager. The near field communication circuit controller then begins routing data between the near field communication interface and the selected execution environment.

In one embodiment, the registry table includes other information in addition to the identification parameters. For instance, a routing flag associated with each near field communication application can be stored within the registry table. The routing flag signals how to route the transaction data flow between near field communication circuit controller and the corresponding secure element or execution environment.

Embodiments of the present invention can automatically select near field communication applications from either a listening mode or a polling mode. In polling mode, the portable electronic device functions in a reader mode or a peer-to-peer initiator mode. In the listening mode, the portable electronic device functions as a card emulator or in peer-to-peer target mode.

The selection process, in one embodiment, occurs when the application discovery manager selects a near field communication application that is compatible with the application technology of the near field communication device. The application discovery manager may also select the near field communication application when it employs an application protocol that is compatible with the near field communication device. Where the external near field communication device transmits an application identifier, the application discovery manager may determine in which secure element or execution environment that particular application resides, and can make the selection in that manner. Further, the application discovery manager may select the near field communication device based upon an identification platform associated with the near field communication device.

Turning now to FIG. 1, illustrated therein is one embodiment of a portable electronic device 100 having near field communication capability in accordance with embodiments of the invention. Specifically, the portable electronic device 100 includes a near field communication circuit 101 having a near field communication circuit controller 102 coupled thereto. The near field communication circuit controller 102 emulates a single near field communication interface such that the portable electronic device 100 can wirelessly communication with a variety of near field communication devices employing various near field communication technologies and protocols. Exemplary near field communication devices include a payment terminal 103, a transportation ticket terminal 104, a smart poster 105, and a RFID tag 106.

The near-field communication circuit 101 can include—as an antenna—a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data.

The near field communication circuit controller 102 can be a microprocessor running embedded code, a transceiver integrated circuit, an application specific integrated circuit, an RFID device, or equivalent device. The near field communication circuit controller 102 works to facilitate data communication with other near field communication devices by transmitting data in radio frequency form. One may refer to the publicly available standard at www.ecma-international.org/publications/files/ECMA-ST/Ecma-340.pdf, which is incorporated herein by reference, for more details. Where the near-field communication is RFID communication, for example, this frequency may be about 13.56 MHz as is directed by recognized RFID standards.

Figure 2:
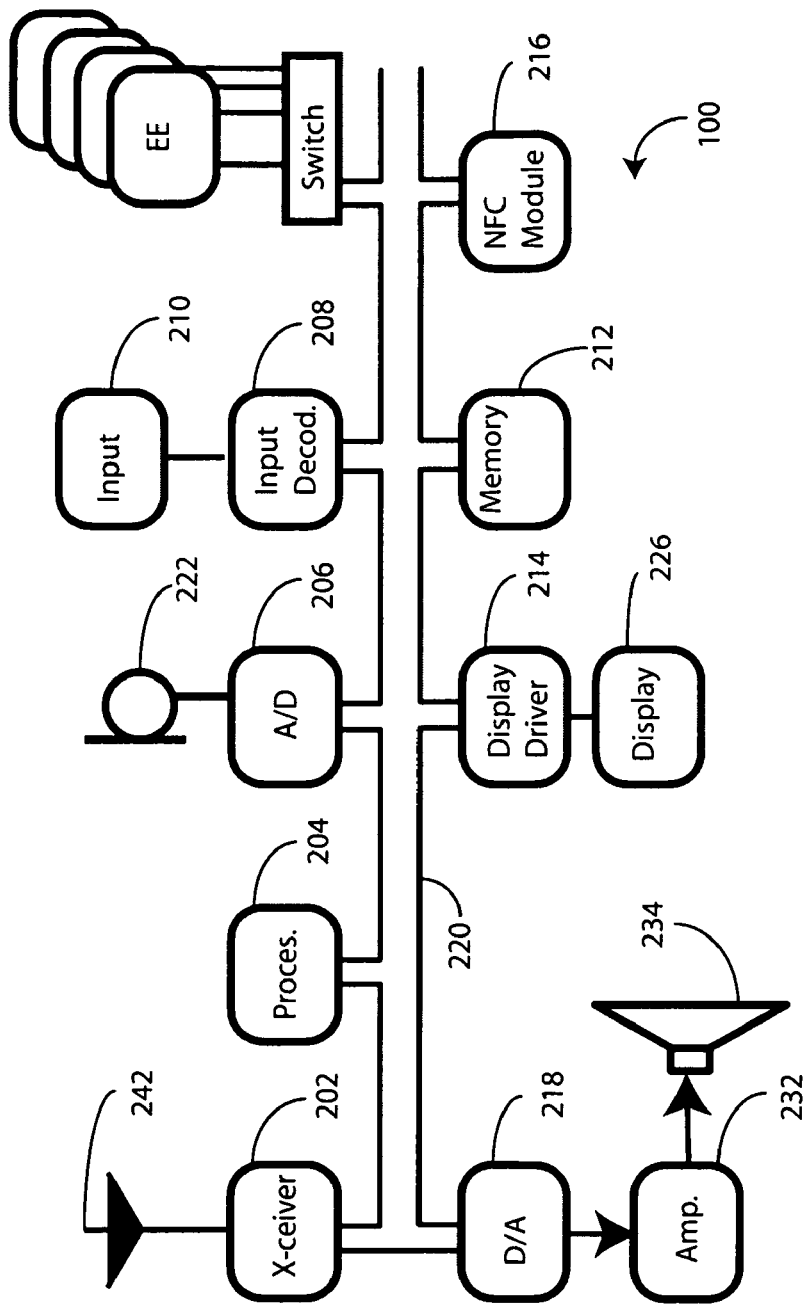
FIG. 2 illustrates a block diagram of a portable electronic device in accordance with embodiments of the invention.

Turning now to FIG. 2, illustrated therein is an exemplary schematic block diagram of the portable electronic device 100 of FIG. 1. For discussion purposes the portable electronic device 100 described herein will be that of a mobile telephone, as they are so prevalent. While a mobile telephone will be used herein as an illustrative embodiment for discussion purposes, it will be clear to those of ordinary skill in the art having the benefit of this disclosure that the invention is not so limited. The application discovery manager and associated method and apparatuses described herein may also be implemented in other portable electronic devices, including personal digital assistants, pagers, portable computers, and so forth.

In one embodiment, the portable electronic device 100 includes a transceiver 202 for communication with wide area networks and a processor 204 for executing the operations of the portable electronic device 100. Other standard components can be included, such as an analog to digital converter (A/D) 206, a input decoder 208, a memory 212, a display driver 214, and a digital to analog converter (D/A) 218. The near field communication circuit 216, which will be explained in more detail below, is also shown. Each component is coupled together through a digital signal bus 220.

The transceiver module 202 is coupled to an antenna 242. Where the portable electronic device 100 is a communication device such as a mobile telephone, carrier signals that are modulated by data, e.g., digitally encoded signals for driving the MFT or digitally encoded voice audio, pass between the antenna 242, and the transceiver 202.

The input device 210 is coupled to the input decoder 208. The input decoder 208 serves to identify depressed keys, for example, and provide information identifying each depressed key to the processor 204. The display driver 214 is coupled to a display 226.

The D/A 218 is coupled through an audio amplifier 232 to a speaker 234. The D/A 218 converts decoded digital audio to analog signals and drives the speaker 234. The audio amplifier 232 may comprise a plurality of amplifiers with each driving a separate speaker.

The memory 212 is also used to store programs that control aspects of the operation of the portable electronic device 100. The memory 212 is a form of computer readable medium.

The transceiver 202, the processor 204, the A/D 206, the input decoder 208, the memory 212, the display driver 214, the D/A 618, the near field communication circuit 216, the audio amplifier 232, and the digital signal bus 620 are embodied in the electrical circuit components and interconnections along a circuit board.

Figure 3:
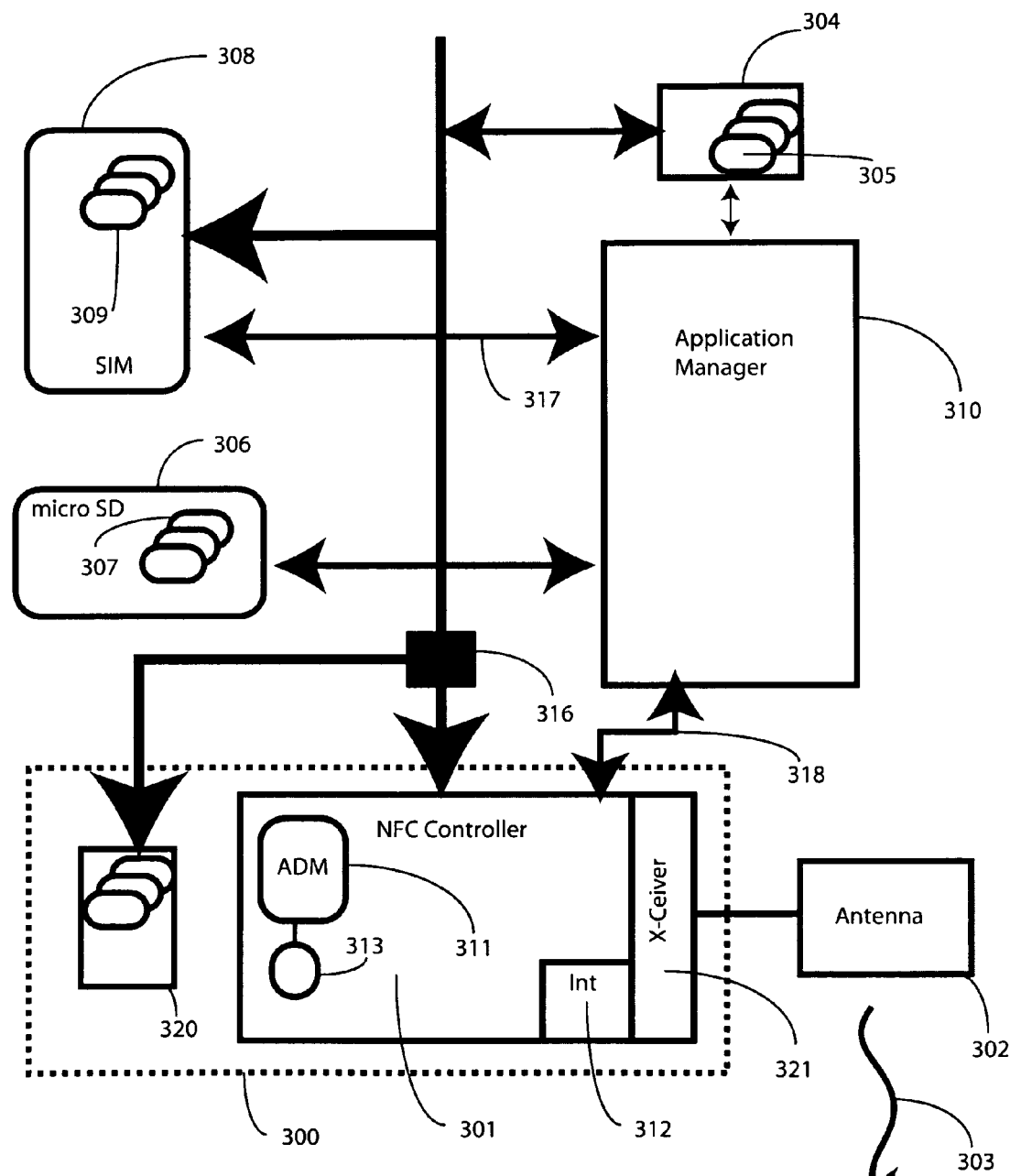
FIG. 3 illustrates a schematic block diagram of a near field communication circuit in accordance with embodiments of the invention.

Turning now to FIG. 3, illustrated therein is one embodiment of a near field communication circuit 216 in accordance with the invention. A near field communication circuit controller 301, which may be a microprocessor, application specific integrated circuit, or other similar device, is configured to facilitate near field communication with external near field communication devices. The near field communication circuit controller 301 is coupled to a near field communication circuit antenna 302, which may be embodied in a coil disposed on a printed circuit board or other substrate. Communication signals 303 are transmitted and received through the near field communication circuit antenna 302. The near field communication circuit controller 301 communicates by way of a near field communication transceiver 321.

An application manager 310 is tasked with managing the various near field communication applications within the portable electronic device. For instance, the application manager 310 maintains a registry of the various near field communication applications. This registry is a table that includes parameters corresponding to the near field communication applications, including an identifier indicating in which execution environment they reside.

The application manager 310 can be used in a variety of ways. For instance, it may be employed in both explicit application selection and implicit application selection. In explicit selection process, the application manager 310 is configured to download routing data from the registry to the near field communication circuit controller 301 to permit the proper routing of data between the near field communication circuit controller 301 and one of the execution environments. In an implicit application selection, the application manager 310 is configured to provide proper routing through the switch 316 for data between the near field communication circuit controller 301 and one or more of the execution environments.

The application manager 310 and near field communication circuit controller 301 may be integrated into a single device. Alternatively, the application manager 310 may be executable computer code operating on a separate processor, application specific integrated circuit or other device that is coupled to the near field communication circuit controller 301.

The near field communication circuit controller 301 and application manager 310 are also coupled to a memory device 304, which is one form of an execution environment. In one embodiment, the application manager's registry table is stored within the memory device 304. An embedded memory device is generally secure, or includes secure regions of memory, and thus constitutes a secure element. As mentioned above, each secure element is a trusted execution environment for near field communication applications 305. The secure elements and execution environments may come in different physical form factors, as is shown in FIG. 3. Further, the near field communication circuit 216, in one embodiment, includes multiple execution environments. The memory device 304 of FIG. 3 is integrated with the near field communication circuit controller 301 and includes a first set of near field communication applications 305. Each near field communication application 305 is configured to be operable with the near field communication circuit controller 301 and the application manager 310.

Other examples of execution environments are also shown in FIG. 3. It will be clear to one of ordinary skill in the art having the benefit of this disclosure that the secure elements shown in FIG. 3 are examples of execution environments, and that other types of execution environments may be employed without departing from the spirit and scope of the invention. Further, any number of execution environments may be used.

A second execution environment shown in FIG. 3 is a micro SD memory card 306. The micro SD memory card 306 includes another set of near field communication applications 307. A third execution environment is a Subscriber Identification Module (SIM) card 308, which is used in many mobile telephones such as those configured for GSM communication. It may further include one or more near field communication applications 309.

An application discovery manger 311, which may be configured as one module of the near field communication circuit controller 301, or as one of the execution environments, is configured to identify a near field communication technology, a data protocol, and an application identifier associated with a remote near field communication device. The application discovery manager 311 identifies this information from the communication signals 303 received from the remote near field communication device.

The near field communication circuit controller 301, in one embodiment, is capable of communication with a wide variety of near field communication technologies and devices. The near field communication circuit controller 301 accomplishes this by emulating a single near field communication circuit interface 312 when communicating with remote near field communication devices. As will be discussed in more detail below, the near field communication circuit can operate in both a polling mode and a listening mode. As such, the near field communication circuit interface 312 appears as a single near field communication card or reader, depending upon mode, to the external near field communication device.

Once the application discovery manager 311 has identified the near field communication technology, the data protocol associated therewith, and the application identifier, it accesses a registry table 313 that is stored in a memory 304 of the portable electronic device. In the exemplary embodiment of FIG. 3, the application manager 310 is configured to download a portion of its registry as the registry table 313. One portion of the registry would include the list of enabled near field communication applications. Another portion of the registry table 313 would include a list of environment identifiers that indicate within which execution environment each enabled near field communication application resides. Another portion of the registry table 313, in one embodiment, stores an identifier for each of the plurality of near field communication applications of a physical execution environment in which each application is stored. The registry table 313 is stored in the embedded memory secure element, however it can be stored in a variety of locations, including in the other execution environments.

The registry table 313 includes information corresponding to the various near field communication applications stored within the various execution environments. For example, in one embodiment, the registry table 313 has stored therein a plurality of identification parameters corresponding to a plurality of detection levels and associated with the plurality of near field communication applications. In one embodiment, the identification parameters identify in which execution environment each near field communication application resides.

As will be described in more detail below, the discovery process can occur at various levels, including an application level, a collision detection level, a protocol level, and so forth. As such, the identification parameters can correspond to a particular level of discovery. Further, the registry table 313 may include identification parameters for each level of discovery. For instance, the identification parameters can be grouped according to corresponding levels of the discovery process: some identification parameters may be at the protocol level (including the mode switch level and collision detection levels) and at the application level. At the protocol level, the identification parameters may include mode switch activity parameters, collision detection activity parameters, or device activation activity parameters. Additionally, each level can have its own parameters, such as the UID, PUPI, AID, SAK, ATQB_DAT, and ATQA parameters that are know to those of the art and are set forth in near field communication standards.

The registry table 313 can also include a routing flag that corresponds to each near field communication application. As with the identification parameters, the routing flags may be grouped according to application discovery levels. Further, each near field communication application can have multiple routing flags, with the routing flags being grouped according to the discovery levels used by the application discovery manager 311.

The registry table 313 can also include additional near field communication application identification parameters as well. The additional identification parameters can be used, for example, in routing the near field communication application selected by the application discovery manager 311 to run in the near field communication circuit controller 301.

Upon detecting the near field communication technology, the communication protocol, and the application identifier, the application discovery manager 311 references the registry table 313 for identification parameters that correspond to at least one of the near field communication technology, the data protocol, or the application identifier. In some cases, the application discovery manager 311 will search for the registry table 313 for identification parameters. corresponding to all three. The application discovery manager 311 then automatically selects one of the near field communication applications based upon identification parameters corresponding to the received communication signal and its associated characteristics. The application discovery manager 311 then works to launch the selected near field communication application.

In launching the selected near field communication application, the selected near field communication application must be able to communicate with the external near field communication device. A routing switch 316 facilitates this communication. In one embodiment, the application discovery manager 311 uses the routing flags to configure the routing switch 316 to route data flow between the near field communication circuit controller 301 and the secure element or execution environment in which the selected near field communication application resides.

By way of example, if the selected near field communication application is one of the near field communication applications 309 residing in the SIM cards 308, the application discovery manager 311 will use the routing flag to configure the routing switch 316 for data flow between the SIM card 308 and the near field communication circuit controller 301.

The application discovery manager 311 may further use the routing flags in launching the selected near field communication application. For instance, in one embodiment, when the routing flag associated with the selected near field communication application is in a true state, the application discovery manager 311 is configured to launch near field communication application.

While the application discovery manager 311 is shown illustratively in FIG. 3 as being a module of the near field communication circuit controller 301, the invention is not so limited. The application discovery manager 311, which can be embodied as executable software commands running on one of the processing components of the near field communication circuit 216, can be located in other devices. Further, it can be partitioned across various elements as well. In some embodiments, such as for card emulation modes, the application discovery manager 311 can be located in the near field communication circuit controller 301. Locating the application discovery manager 311 here can work to reduce time latency dependency from the application manager 310.

In a polling application, the application discovery manager 311 can be selectively allocated to any of the processing components of the near field communication circuit 216 by a central processor. This may be done due to the strict timing requirements associated with polling external devices.

To illustrate by way of example, in card emulation applications, the application discovery manager 311 and the registry table 313 may be allocated into selected execution environments corresponding to card emulation applications. For instance, all card emulation near field communication applications could be allocated to one execution environment or secure element, all peer-to-peer near field communication applications could be allocated to another execution environment, and all reader/writer near field communication applications could be allocated to another execution environment. As such, data communication would need to be routed to an execution environment for a specific mode. Application selection could then be managed within that execution environment.

In such an application, the application discovery process can be completed as a two-step process. In the first step, working a the collision detection level, the application discovery manager 311 identifies the external near field communication device as a card or peer-to-peer target, a reader, or a peer-to-peer initiator based upon commands received. The application discovery manager 311 then selects a near field communication application within its execution environment based upon application level discovery. The "application discovery manager partitioning" presumes allocation of two protocol low levels and proper routing at the near field communication circuit controller 301.

As noted above, the near field communication circuit 216 is capable of communication with a variety of near field communication technologies. For instance the near field communication circuit interface 312, in one embodiment, is capable of emulating near field communication application execution in accordance with the timing requirements defined by ISO/IEC 14444-3 and NFCIP standard. Further, the near field communication circuit interface 312 may be configured to support other legacy applications such as Mifare, Felica, and others. While the various near field communication applications can reside in various secure elements, when the application discovery manager 311 selects an application and configured the routing switch 316, the near field communication circuit interface 312 can then emulate a single, contactless, near field communication device corresponding to the selected application.

In the embodiment of FIG. 3, there are three physical interfaces that work in the execution of the overall system. A first physical interface is the peripheral interface. This interface is the interface between the application manager 310 and the secure element in which the selected near field communication application resides, e.g. interface 317, as configured by the routing switch 316. The second interface 318, the host interface, is that between the application manager 310 and the near field communication circuit controller 301. A third interface 319, the near field communication interface, is that between the near field communication circuit interface 312 and its secure element 320, in which secure applications reside.

In accordance with embodiments of the invention, the selected near field communication application can reside in any execution environment, be it a SIM card 308, a secure element such as memory 304 associated with the application manager 310, or a secure element 320 associated with the near field communication circuit controller 301. Each interface can be configured to comply with required near field communication timing requirements, including those associated with card emulation modes, legacy application modes, or other modes.

In addition to selecting and launching a near field communication application, the application discovery manager 311, in one embodiment, is configured to download operable parameters associated with the selected near field communication application to the near field communication circuit controller 301. In one embodiment, the application discovery manager 311 is further configured to enable the selected near field communication application based upon the identification parameters 315.

The application manager 310 can also download operable parameters to the near field communication circuit controller 301. For instance, in the implicit selection process the application manager 310 configures the near field communication circuit controller for routing data to an execution environment corresponding to one of the near field communication applications. In the explicit selection process, the application manager 310 provides routing of the near field communication circuit controller's interfaces of the execution environment corresponding to the selected near field communication application by configuring the switch 316.

The application discovery manager 311 an application manager 310 can function, in one embodiment, in one of a couple of modes. These modes can be initiated by either the user or the remote near field communication device. Where the user initiates a mode, the selection of a particular near field communication application can be either explicit or implicit.

In the explicit selection, a user alerts the portable electronic device through a user interface that a near field transaction is about to take place. The application discovery manager 311 may then select a default application from one of the execution environments. With implicit selection, the remote near field communication terminal triggers the application discovery manager 311. For instance, a financial transaction may be about to transpire, with a plurality of cards in an electronic wallet being suitable for use with a particular near field communication device. The application discovery manager 311 coordinates the various possible selections with the routing switch 316 and the many execution environments, with the final selection being made by the remote near field communication device.

The application discovery manager 311, in one embodiment, is configured to work on at least two different levels. By referencing the registry table 313, the application discovery manager 311 can select a near field communication application from one of the various execution environments. However, any one execution environment may contain multiple near field communication applications suitable for use with a particular near field communication device. As such, the application discovery manager 311 is further configured to make an application selection from within a single execution environment. At the second level, i.e., within a particular execution environment, the application discovery manager 311 can make the application selection in a variety of ways. Examples include differentiating applications by near field communication technology or differentiating by near field communication mode, such as R/W, CE, peer-to-peer initiator, and target.

Figure 4:
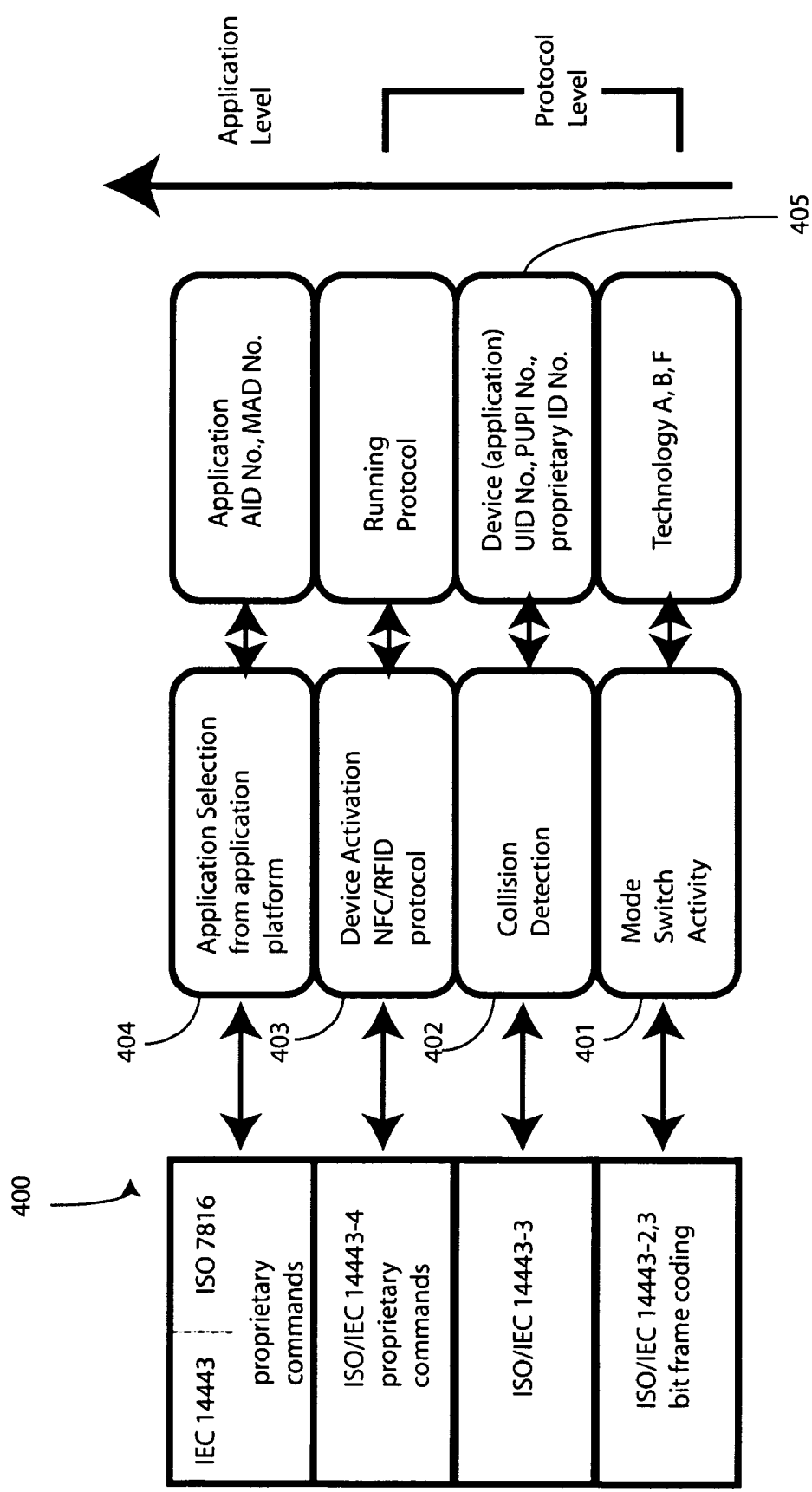
FIG. 4 illustrates various stack levels used in an application discovery process in accordance with embodiments of the invention.

As noted above, the application discovery process can occur at various levels. Turning now to FIG. 4, illustrated therein are the various levels 400 as set forth in the ISO 1444-3 and ISO 7816 standards, which are incorporated herein by reference. The levels include the mode switch activity level 401, the collision detection level 402, the protocol level 403, and the application level 404. The application discovery manager (311) uses these levels in the selection of the near field communication application.

The mode switch activity level 401 allows for the detection of near field communication technologies. As will be described below, the portable electronic device may initially be placed in either a polling mode or a listening mode. Where no near field communication technology is detected, the mode switch activity level 401 can toggle between the polling and listening mode. Alternatively, it can remain in a single mode.

In the polling mode, the application discovery manager (311) can send polling commands for each of the technologies supported by the near field communication circuit (216) at the mode switch activity level 401. In the listening mode, the application discovery manager (311) selects one technology at the mode switch activity level 401 and then waits for polling commands from a remote near field communication device. Once the presence of one or more technologies is detected, activity at the mode switch activity level 401 ends. The near field communication circuit (216) further has a mode assigned, be it the polling mode or the listening mode.

At the collision detection level 402, the application discovery manager (311) is capable of determining the identification of a responding near field communication device, as well as its protocol support. Collisions of data between devices can also be detected. In the polling mode, the near field communication circuit (216) sends commands to determine the presence of one or more near field communication devices, as well as the identity of each. In the listening mode, the near field communication circuit (216) provides its identifier and protocol support to the near field communication device in response to commands received. Outputs 405 of collision detection activity level operations can be a detected device identification number (UID/PUPI/etc.).

At the device activation level, the near field communication circuit (216) functions as follows: in the polling mode, the near field communication circuit (216) activates the remote near field communication device. Once activated, the near field communication device enters one of four operational states known to those of ordinary skill in the art. These states include initiator, target, read/write, or card emulator. The opposite occurs in the listening mode.

The near field communication application family corresponding to a remote near field communication device can be detected in two ways. The application family selected will be based upon the AID number and the SELECT_APDU command set forth in the ISO 7816 standard. The first way to identify the application family is to do it at the collision detection level 402 based upon a RATS command received from the remote near field communication device terminal as set forth in the ISO/IEC 14443-3 standard. Where identification occurs in this manner, the level following the collision detection level, as set forth in the 14443-3 standard, must be executed to ensure protocol activation.

The identification can also take place at the application level 404. Here, identification occurs as follows: based upon the SELECT_APDU command set forth in the ISO 7816 standard, the near field communication circuit (216) returns file control identification data. In response, the near field communication device transmits a SELECT_AID command, with a corresponding AID number. The AID number corresponds to the file control identification data.

The application discovery manager (311) the selects a near field communication application which supports the specific application AID number from the many near field communication applications stored within the various execution environments. The application discovery manager (311) does this by referencing the registry table (313) and selecting a family of applications and the execution environments in which they are stored.

Figure 5:
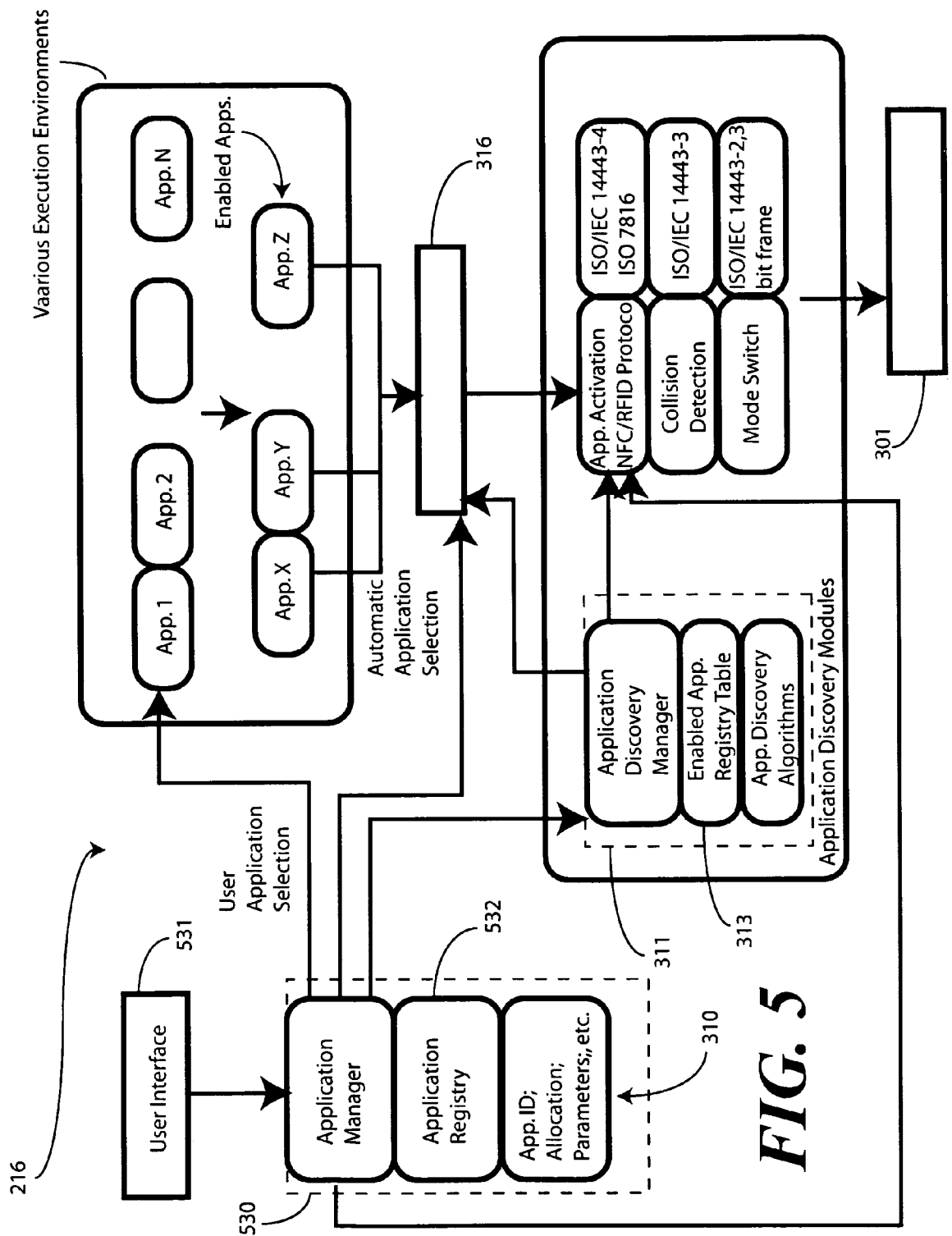
FIG. 5 illustrates a block diagram of modules used with a near field communication circuit in accordance with embodiments of the invention.

Turning now to FIG. 5, illustrated therein are the various modules for the circuit of FIG. 3. Each one of these modules can be configured as executable software configured to operate on a processing circuit. The modules provide one example of a near field communication circuit 216 that can be used in the near field communication application selection process.

The application manager 310 has the following functions: First, it is responsible for interpreting user commands received from a user interface 531. These commands determine whether the near field communication application discovery process will be implicit or explicit.

Next, the application manager 310 is responsible for maintaining a registry 532 of the various near field communication applications stored within the various execution environments. The registry 532 is a part of the application manager's database, and includes the identification parameters of each near field communication application from each execution environment. Examples of identification parameters include an application identification number, UID, PUPI, AID, SAK, ATQB_DAT, ATQA, and so forth. The registry 532 can also include any required near field communication protocol parameters. It may also include application data or application family identifiers, for ISO 1444-3B type applications. As the near field communication applications can be stored in various execution environments, the registry 532 may also include hardware information such as application allocation information, hardware device identifiers, environment execution identifiers, and so forth. Each application's identifiers may be stored as a complete table within the registry 532.

user. The application manager 310 may further disable near field communication applications when directed to do so by the user.

One of the features of embodiments of the present invention, however, is that the user need not stumble through menus and commands to select a near field communication application, as this can be done by the application discovery manager 311. To accommodate this feature, the application manager 310 is equipped with additional features. First, the application manager 310 is configured to download a portion of its registry 532 into the application discovery manager 311 where the user wants an implicit automatic selection. The portion of the registry 532 that is downloaded, in one embodiment, is a table of all enabled applications. This download will become part of the registry table 313 used by the application discovery manager 311.

Next, the application manager 310 is configured to set the routing switch 313 such that data may flow between an execution environment having a near field communication application corresponding to the user's implicit selection and the near field communication circuit controller 301. Where the user selection is explicit, the application manager 310 configured the routing switch 313 to route data to the execution environment having the selected near field communication application.

The application discovery manager 311 then uses the downloaded, enabled application information as its registry table 313. The registry table 313 will include parameters based upon implicit selection by the user, including the near field communication application identification parameters, physical allocation identification information (e.g. in which execution environment the various applications are stored—this information will be used by the application discovery manger to configure the routing switch 316 to connect the proper execution environment with the near field communication circuit controller 301), and so forth. The following table illustrates one example of the registry table 313 contents:

TABLE 1

| Level of applet selection | Applet identification output parameters | Routing Event |
|---|---|---|
| Mode Switch | Technology type (A or B or F) | True/false state of this level selection signals of the routing to corresponding SE with Element ID# |
| Collision detection | Device type (card or PEER-TO-PEER target, or PEER-TO-PEER initiator, or Reader), | True/false state |
| Collision detection (application identifications) | UID#, PUPI#, proprietary based applications | True/false state |
| Application selection | Application selection (UID, PUPI) from identify family, AID#, MAP#, etc. | True/false state |
| Application selection | Specific provider AID# | True/false state |
| Additional applet identification | Output parameters for execution | |
| Protocol parameters | Specific parameters to run the applet at NFCC | |
| Allocation of applet into mobile | Mobile Element ID# | |

Figure 6:
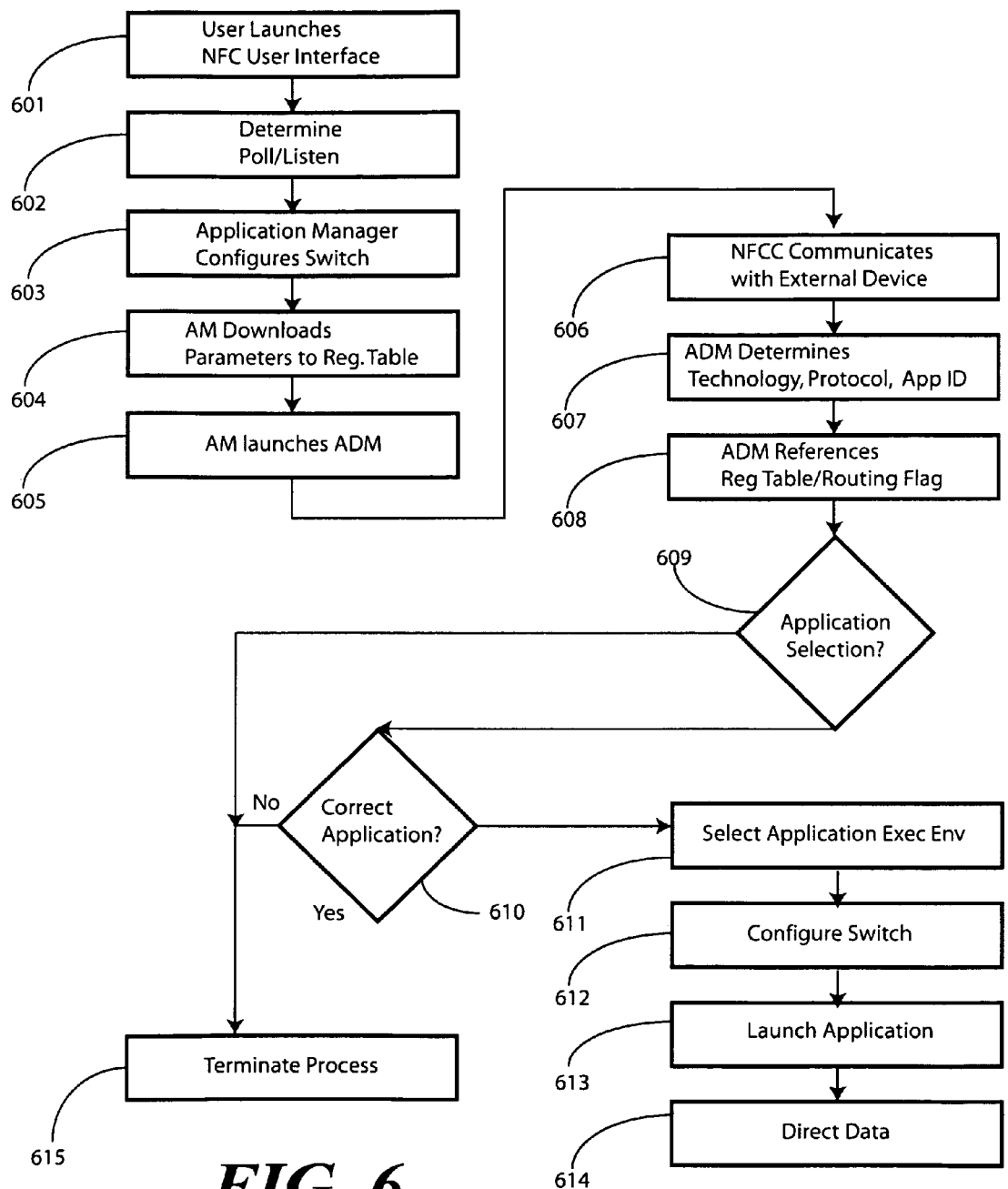
FIG. 6 illustrates one method of automatically selecting and launching a near field communication application in accordance with embodiments of the invention.
Figure 7:
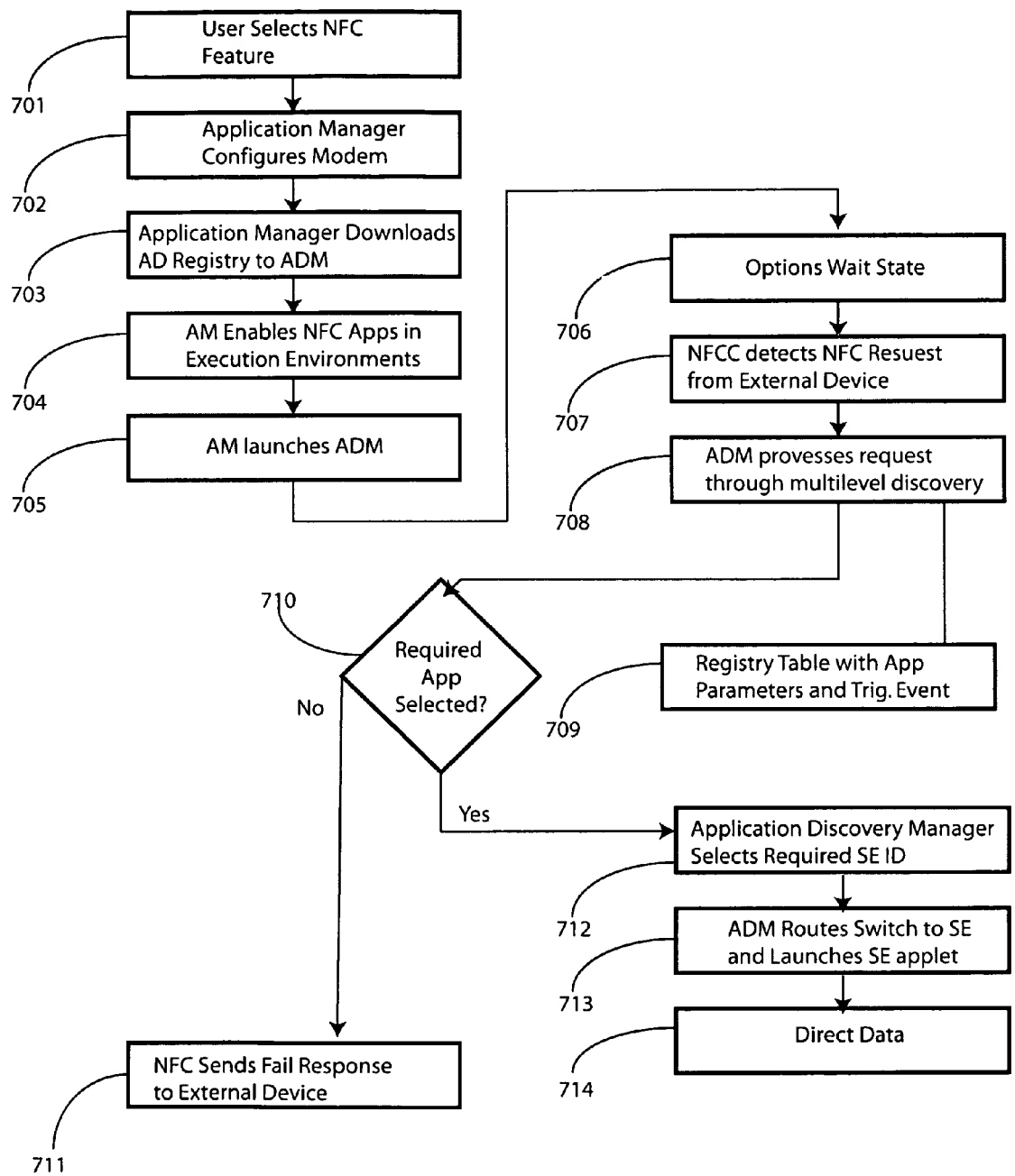
FIG. 7 illustrates one method of automatically selecting and launching a near field communication application in accordance with embodiments of the invention.

Note that as a user may intentionally select one of the near field communication applications in some situations, the application manager 310 is further configured to enable a selected near field communication application based on input received from the user interface 531. The application manager 310 can launch such applications when selected by the Turning now to FIG. 6, illustrated therein are the steps of one method for automatically selecting a near field communication application from a plurality of near field communication applications in accordance with embodiments of the invention. The method can be executed in when the portable electronic device is in either a polling mode or a listening mode. FIG. 6 presents a high-level view of one method in accordance with embodiments of the invention. FIG. 7 will then illustrate a more detailed module-level method of the operation in accordance with embodiments of the invention. Once the general method has been described, FIGS. 8 and 9 will examine each mode individually.

At step 601, a user launches the near field communication interface. As the near field communication feature is generally one of many features in a portable electronic device, the user may have the option of enabling/disenabling it. For example, when the user is at home, he may disable the near field communication feature to conserve power. However, during the week when the user is traveling and is using near field communication applications, he may elect to either selectively actuate the near field communication feature or leave it continually on.

Once the near field communication feature has been actuated, the device must determine whether it is in the polling or listening mode. This occurs at step 602. The polling mode will be when the user desires the portable electronic device to actively seek out a near field communication device. The listening mode will be when the user wants the portable electronic device to listen for other devices that may be polling it. The differences between these modes will be examined in more detail with in the discussion of FIGS. 8 and 9.

Once the near field communication feature is enabled, the application manager (310) configures the switch (316) with the necessary routing parameters to communicate with execution environments having enabled applications residing therein at step 603. The application manager (310) downloads at least a portion of its application registry (532) to the application discovery manager (311) for the registry table (313) at step 604. Further, the application manager (310) can download necessary parameters to the near field communication circuit controller (301) and its corresponding modem to configure the near field communication circuit controller registers to operate near field communication applications at this step. Additionally, the application manager (310) can initialize the application discovery manager (311) to manage the automatic selection of a near field communication application at all protocol and application levels at step 605.

At step 606, the near field communication circuit (300) communicates with the external near field communication device. This communication is a handshaking process to establish a communication link between the near field communication circuit (216) and the external device. During the communication process, information about the external near field communication device is exchanged. At step 607, the application discovery manager (311) identifies at least a near field communication technology, a communication protocol, and an application identifier associated with the external near field communication device. This can be done when the near field communication device transmits a near field communication device request during the initial communication at step 606.

At step 608, the application discovery manager (311) references the registry table (313). As discussed above, in one embodiment the registry table (313) includes identification parameters associated with the various near field communication applications stored within the various execution environments of the device. Also as noted above, the application discovery manager (311) may reference both application level parameters and protocol level parameters. Further, these parameters may be sequentially referenced once the communication protocol and application identifier had been detected. The application discovery manager (311) scans the registry table (313) for identification parameters corresponding to the near field communication technology, the communication protocol, and the application identifier detected from the near field communication device request. Further, while referencing the registry table (313) the application discovery manager (311) can, in one embodiment, determine the routing flags associated with each near field communication application.

Where no corresponding identification parameters are found, as determined by decision 609, the application discovery manager terminates the application selection process at step 615. The termination process can include the transmission of a failed selection response to the external near field communication device.

Where there are identification parameters corresponding to the external device, the application discovery manager (311) selects at least one near field communication application based upon the identification parameters and the near field communication technology, communication protocol, and application identifier at step 611. For instance, the application discovery manager (311) can select the near field communication application by selecting an application that has an application technology that is compatible with the near field communication device. Alternatively, the application discovery manager (311) can select the near field communication application by selecting an application having an application protocol supported by the portable electronic device that corresponds to the external near field communication device. Additionally, the application can be selected by an application identification parameter that corresponds to the near field communication device or the application identifier of the near field communication device request. Further, the application can be selected in accordance with an application platform corresponding to the near field communication device. By referencing the registry table (313), the application discovery manager (311) further can determine within which secure element or execution environment the selected near field communication application resides.

At step 610, the application discovery manager (311) configures the routing switch (316) such that data can be routed between the near field communication circuit interface (312) and the execution environment or secure element in which the selected near field communication application resides. This allows the near field communication circuit controller (301) to direct data from the external near field communication device through the near field communication circuit interface (312) to an execution environment associated with the selected near field communication application. In one embodiment, the routing flag can be used both to configure the switch and in the direction of data.

At decision 610, the application discovery manager (311) can optionally present a prompt to the user inquiring whether the automatically selected near field communication application communication is a correct choice. The user, through the user interface (531) then provides a selection signal, and the appropriateness of the selection.

Upon the receipt of this selection signal from the user, where such a signal is used, the application discovery manager (311) selects an execution environment corresponding to the selected near field communication application and configures the near field communication circuit (216) to route data between the near field communication circuit interface (312) and the selected execution environment. At step 613, the selected near field communication application is launched.

Data is routed between the near field communication circuit and the selected execution environment at step 614. Once the transaction is complete, the process is terminated at step 615.

Turning now to FIG. 7, illustrated therein is a method corresponding to the operation of the various modules in accordance with embodiments of the invention. The method of FIG. 7 can be used with either the polling or listening modes.

At step 701, the user launches the near field communication feature. By way of example, the user may select an icon labeled "NFC" through the user interface of a portable electronic device. As mention above, as the near field communication feature may be one of many applications operable with a portable electronic device, the user may be able to optionally activate or deactivate it. This step may optionally power ON the near field communication circuitry. The step 701 of user actuation can also open a near field communication application manager configured to make an automatic application selection in accordance with embodiments of the invention.

Once the near field communication feature is enabled, the application manager (310) configures the near field communication modem for communication with external devices at step 702. This step can include bootstrapping the modem for communication by configuring it with code. This step can also include providing information relating to the various execution environments having enabled applications residing therein. This step can also include providing the necessary routing parameters to the near field communication modem for communication with the various execution environments.

At step 703, the application manager (310) downloads at least a portion of its application registry (532) to the application discovery manager (311) for the registry table (313) associated with selected modes of communication modem and a few implicitly pre-selected applications, which user intends to use. Further, the application manager (310) can download necessary parameters to the near field communication circuit controller (301) and its corresponding modem to configure the near field communication circuit controller registers to operate near field communication applications at this step. At step 704, the application manager (310) can initialize user pre-selected applications at an execution environment for a fast response to an external device communication request upon a further selection step. The application manager (310) then launches the application discovery manager (311) at step 705 to manage the automatic selection of a near field communication application at all protocol and application levels.

At step 706, an optional wait state is provided for external devices to come within communication proximity with the portable electronic device. In the polling mode, this wait state may not be required, as the user will generally pass the electronic device across the external object shortly after selecting the near field communication application. However, in the listening mode this wait state may be desirable so that the near field communication application has at least a predetermined amount of time in which to communicate with external devices.

At step 707, the near field communication circuit (216) detects a near field communication request from an external device. This communication can be a handshaking process to establish a communication link between the near field communication circuit (216) and the external device. During the communication process, information about the external near field communication device can be exchanged.

At step 708, the application discovery manager (311) processes the near field communication request received at step 707 through the various levels of discovery (collision detection, application, etc.). This processing, as described above, can include access of the registry table (313) that includes parameters associated with the various enabled near field communication applications and corresponding triggering events, as illustrated at step 709. By referencing the registry table (313), the application discovery manager (311) is able to scan for identification parameters corresponding to the near field communication technology, the communication protocol, and the application identifier detected from the near field communication device request. Further, while referencing the registry table (313) the application discovery manager (311) can, in one embodiment, determine the routing flag associated with each near field communication application.

In one embodiment, the application discovery manager (311) scans the identification parameters at each level of discovery to determine whether the identification parameters in the registry table 313 match of communication protocol parameters required from the external device. Where they do, the application discovery manager (311) then checks to see if the routing flag is in a true state. Where the identification parameter matches and the routing flag is in a true state, which is indicative of a sufficiency of application identification, the application discovery manager (311) then transfers near field communication transaction processing to an execution environment corresponding to the identified application for further processing. In other words, the registry table (313) includes at least one routing flag with true state corresponding to each of the plurality of near field communication applications. The interface switch employs the at least one routing flag for data flow between the near field communication circuit controller and the at least one execution environment when the at least one routing flag is in a true state. A plurality of routing flags are used, with each of the plurality of routing flags being arranged according to discovery levels on a one-to-one basis. Note that every level of discovery can have its own routing flag, but that only a routing flag in a true state signals a sufficiency of discovery. When the application discovery manager (311) detects a match in identification parameter and a true routing flag, the application discovery manager is configured to transfer a near field communication transaction to the at least one execution environment for further processing. Where a match in identification parameter and a false routing flag occurs, the application discovery process proceeds to the next level of discovery process.

Thus, just to further emphasize one embodiment of operation, the application discovery manager (311) receives a communication request from an external device. The request associates the specific communication protocol which can be identified by protocol and application identification parameters. The application discovery manager (311) then begins a discovery process at one level of discovery, such as the application discovery level. If the received identification parameter matches the parameter in the registry table (313), the application discovery manager (311) checks the routing flag to determine whether it is in a true state. Where it is, the application discovery manager (311) transfers near field communication processing to an execution environment in which the identified application is stored. If either the routing flag is in a false state, or the identification parameter does not match, the application discovery manager (311) proceeds to the next level of discovery, which may be the collision detection level.

At decision 710, the application discovery manager (311) determines whether a near field communication application having identification parameters corresponding to the external device is found. Where it is not, in one embodiment, the near field communication circuit (216) transmits a failed response to the external device at step 711.

Where the application is found, the application discovery manager (311) selects at least one near field communication application based upon the identification parameters and the near field communication technology, communication protocol, and mobile element identifier at step 712. This identifier is located in registry table and associates every application with mobile execution environment, where the application resides.

At step 713, the application discovery manager (311) configures the routing switch (316) such that data can be routed between the near field communication circuit interface (312) and the execution environment or secure element in which the selected near field communication application resides (based on application identifier at the portable electronic device). This allows the near field communication circuit controller (301) to direct data from the external near field communication device through the near field communication circuit interface (312) to an execution environment associated with the selected near field communication application. The application discovery manager (311) additionally launches the selected near field communication application. The application discovery manager (311) additionally launches the selected near field communication application.

At step 714, application is executed from selected execution environment and continues communication protocol in accordance with the requirements of the selected application.

Figure 8:
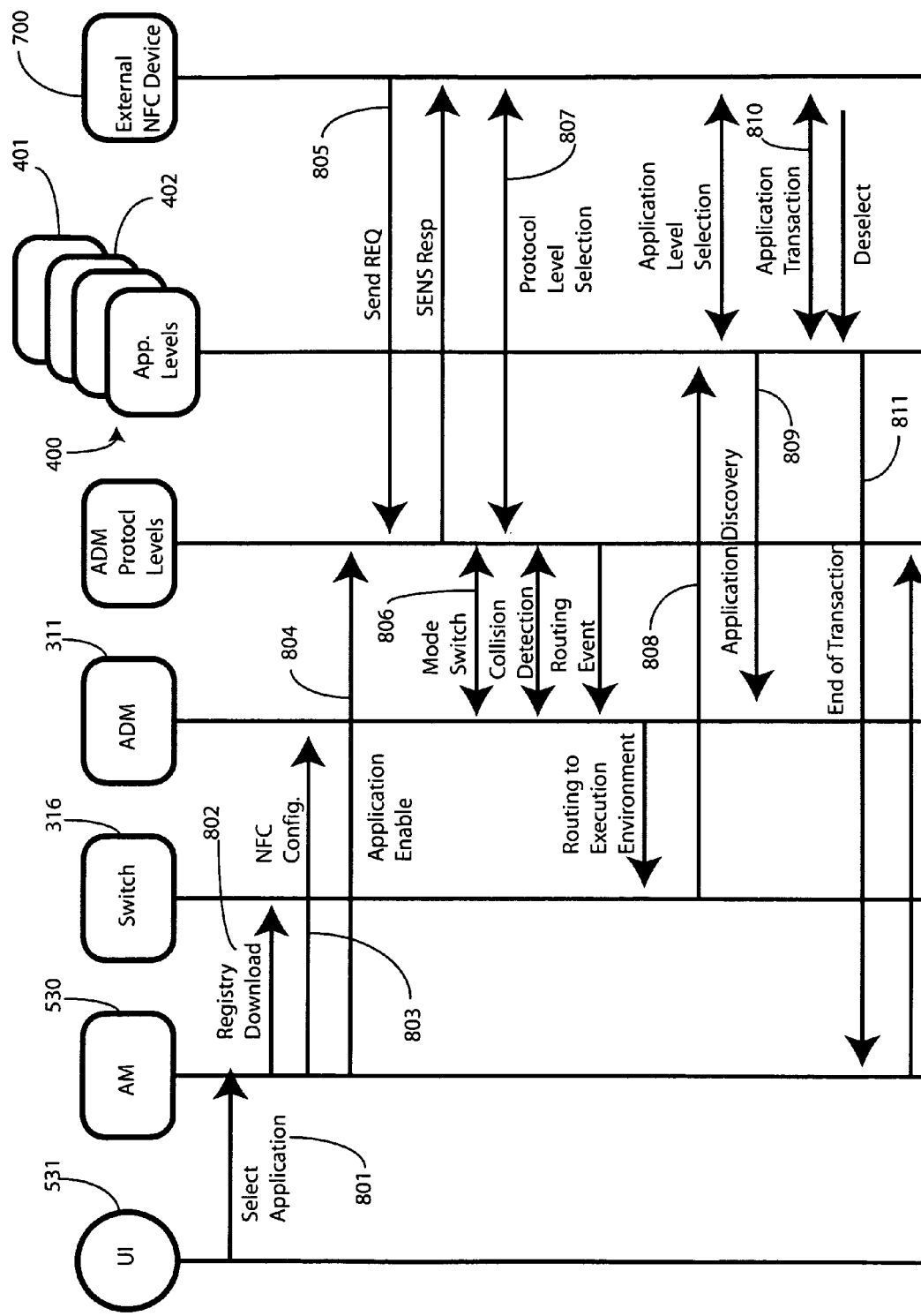
FIG. 8 illustrates a signal flow diagram of one method of automatically selecting and launching a near field communication application in accordance with embodiments of the invention when a near field communication circuit is in listening mode.

Now that the general method is understood, the differences between the polling mode and listening mode will be described. Turning now to FIG. 8, illustrated therein is a signal flow diagram illustrating the near field communication application selection process when the portable electronic device is in the listening mode.

The user actuates the near field communication feature through the user interface 531 at activity 801. By way of example, a user may select the near field communication circuit from a list of icons on a display. Alternatively, the user may select an electronic wallet having a few commonly used, personal "virtual cards", such as a transportation pass, a credit card, and a debit card. This launches the near field communication user interface.

Once this occurs, at activity 802 and activity 803, the application manager 310 selects one or more near field communication application identification parameters, such as application identifiers of enabled applications, from its application registry (532) and sends them to the application discovery manager 311 and near field communication circuit controller (301), respectively. This works to enable, through the routing switch 316, an interface between near field communication circuit controller (301) and the corresponding execution environment based upon the identification parameters. It also works to configure the application discovery manager's registry table. At activity 804, the application manager 310 enables various near field communication applications. This can occur at various levels 400.

At activity 805, once communication is established with the external near field communication device 700, a SENS_RESP message is exchanged between the near field communication circuit (216) and the external near field communication device. At activity 806, the mode switch is initialized. Note that both the mode switch activity level 401 and the collision detection level 402 use enabled near field communication application identification parameters from the application discovery manager 311 during the initialization. Where there is no enabled identification parameter in the registry table (313) of the application discovery manager 311 during the processing protocol, the near field communication process terminates. Where the near field communication technology, such as type A, B, or F, is identified, the near field communication circuit (216) transmits a corresponding to technology command response at activity 807. Further, at the next level, which is the collision detection level 402, the near field communication circuit (300) responds to the external near field communication device 700 with a target identification, such as card or Peer-to-Peer target, an application identifier, such as PUPI, UID number, or family identifier for APDU or MAP based applets, and so forth.

At activity 808, where the application identifier has been determined at the collision detection level 402, the application discovery manager 311 references its registry table (313) to determine identification parameters and a routing flag corresponding to this level of discovery.

The application discovery manager 311 then determines that the discovery of near field communication technology, communication protocol, and application identifier has been completed. The application discovery manager 311 thus determines that future data transactions, including the selection of a specific near field communication application, must be done with a particular execution environment or secure element.

The application discovery manager 311 selects the identification parameters—like the routing flag—from the registry table (313) and transfers them to the routing switch 316. The routing switch 316 is then able to establish data routing between one execution environment and the near field communication circuit controller (301).

At activity 809, the selected near field communication application is pre-enabled for implicit selection by the external near field communication device 700. As data is routed through the routing switch 316 to the corresponding execution environment, the selected near field communication application will respond automatically to the next transaction commands received from the external near field communication device.

At activity 810, the selected near field communication application executes in conjunction with the external near field communication device 700. For instance, where the transaction is a payment transaction and the selected near field communication application is a virtual credit card, a payment transaction occurs.

At activity 811, when the transaction is complete, the execution environment sends an END_TRANSACTION command to the application manager 310. This notifies the user interface 531 that the transaction is complete and can optionally turn off the near field communication circuit (216).

Figure 9:
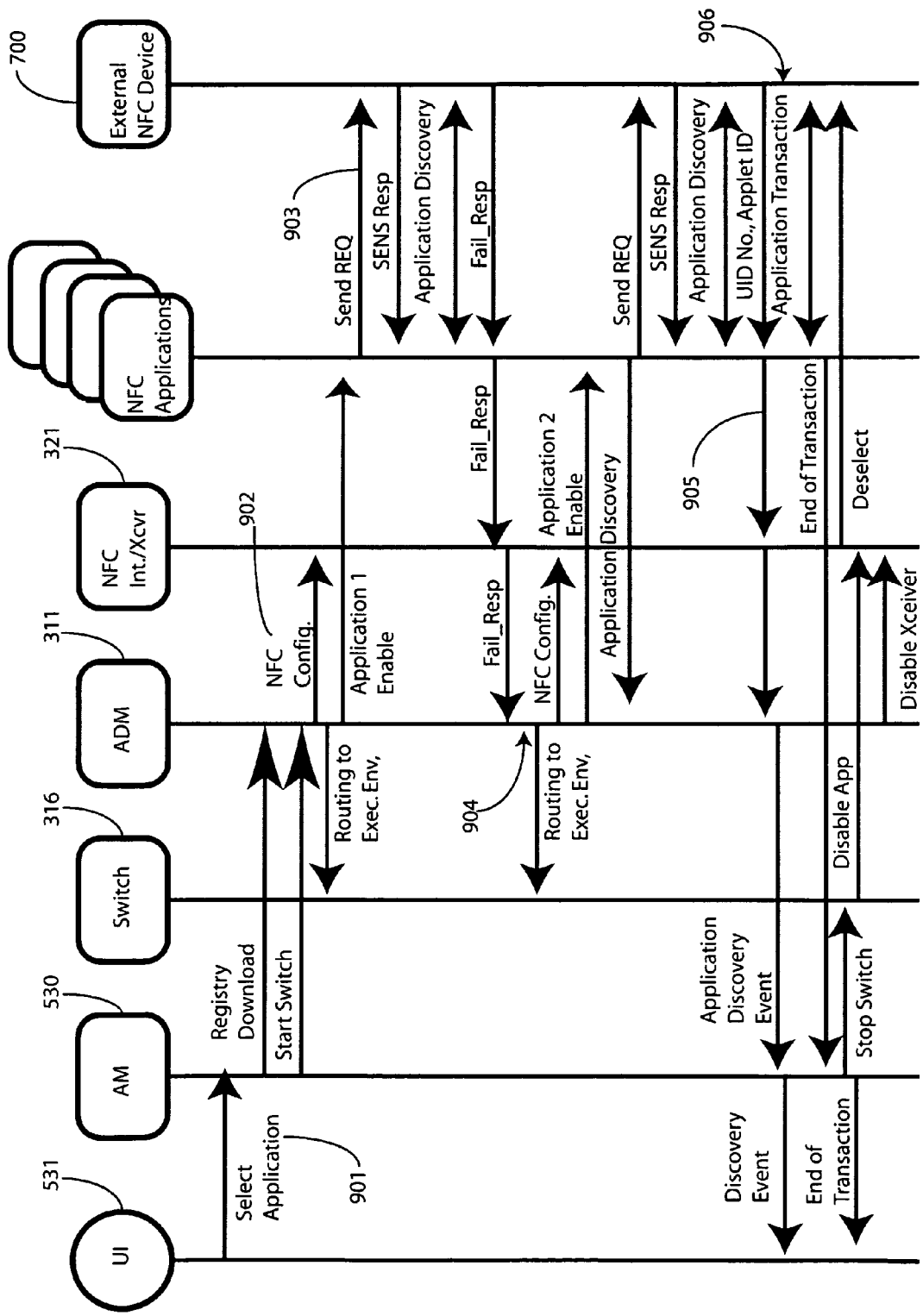
FIG. 9 illustrates a signal flow diagram of one method of automatically selecting and launching a near field communication application in accordance with embodiments of the invention when a near field communication circuit is in polling mode.

Turning now to FIG. 9, illustrated therein is a signal flow diagram illustrating the near field communication application selection process when the portable electronic device is in the polling mode. The polling mode is somewhat similar to the listening mode, with only a few differences that will be highlighted here. Further, note that in FIG. 9 the selection process is performed twice, with a first application being selected and rejected by the external device, and then a second application being selected and accepted.

At activity 901, in response to the user selecting the polling near field communication mode, the application manager 310 selects certain near field communication applications based upon the user input and the user profile stored in the portable electronic device. As with the listening mode, the application manager 310 transmits the registry data of the selected applications to the application discovery manager 311 and initializes the application discovery manager to start the polling mode procedure.

At activity 902, the application discovery manager 311 configures the routing switch 316 and the near field communication circuit transceiver 321 for data communication between the external near field communication device 700 and the one or more selected applications. The application discovery manager 311 additionally configures the parameters required by the near field communication circuit (300) to run the protocol for the selected near field communication application. By way of example, the protocol could be a particular near field communication technology, a reader protocol, a peer-to-peer mode, and so forth. The near field communication circuit transceiver 321 then transmits sequential polling commands to the external near field communication device 700 according the selected near field communication application priority, as determined by the application discovery manager 311. The application discovery manager 311 further controls the routing switch 316 to ensure that data is transferred to the appropriate execution environment.

At activity 903, the external near field communication device 700 sends commands at the collision detection level 402 to determine the presence of the external near field communication device 700, as well as the identity of the external near field communication device 700. At activity 904, once communication has been established, the application discovery manager 311 launches the selected near field communication application. The application discovery manager 311 also performs any latent near field communication circuit transceiver 321 and routing switch 316 configuration that may be necessary for communication with the execution environment in which the selected near field communication application resides.

At activity 905, where the selected near field communication application is running at the collision detection level 402 and where the near field communication circuit transceiver 321 receives a positive response from the external near field communication device 700 (such as a response including the near field communication technology, protocol, and application identifier), the selected near field communication application continues to operate. The application discovery manager 311 can send an application discovery message to the application manager 310. The application discovery manager 311 may also notify the user that an application has been discovered through the user interface 531.

At activity 906, the selected near field communication application executes its near field communication transaction. Once the transaction is completed, the application manager 310 is notified by either the execution environment associated with the selected near field communication application or by the near field communication circuit transceiver 321. The application manager 310 can then send a STOP_SWITCH command to the application discovery manager 311 and can notify the user that the transaction is complete. The application discovery manager 311 then optionally disables the near field communication circuit transceiver 321.

Figure 10:
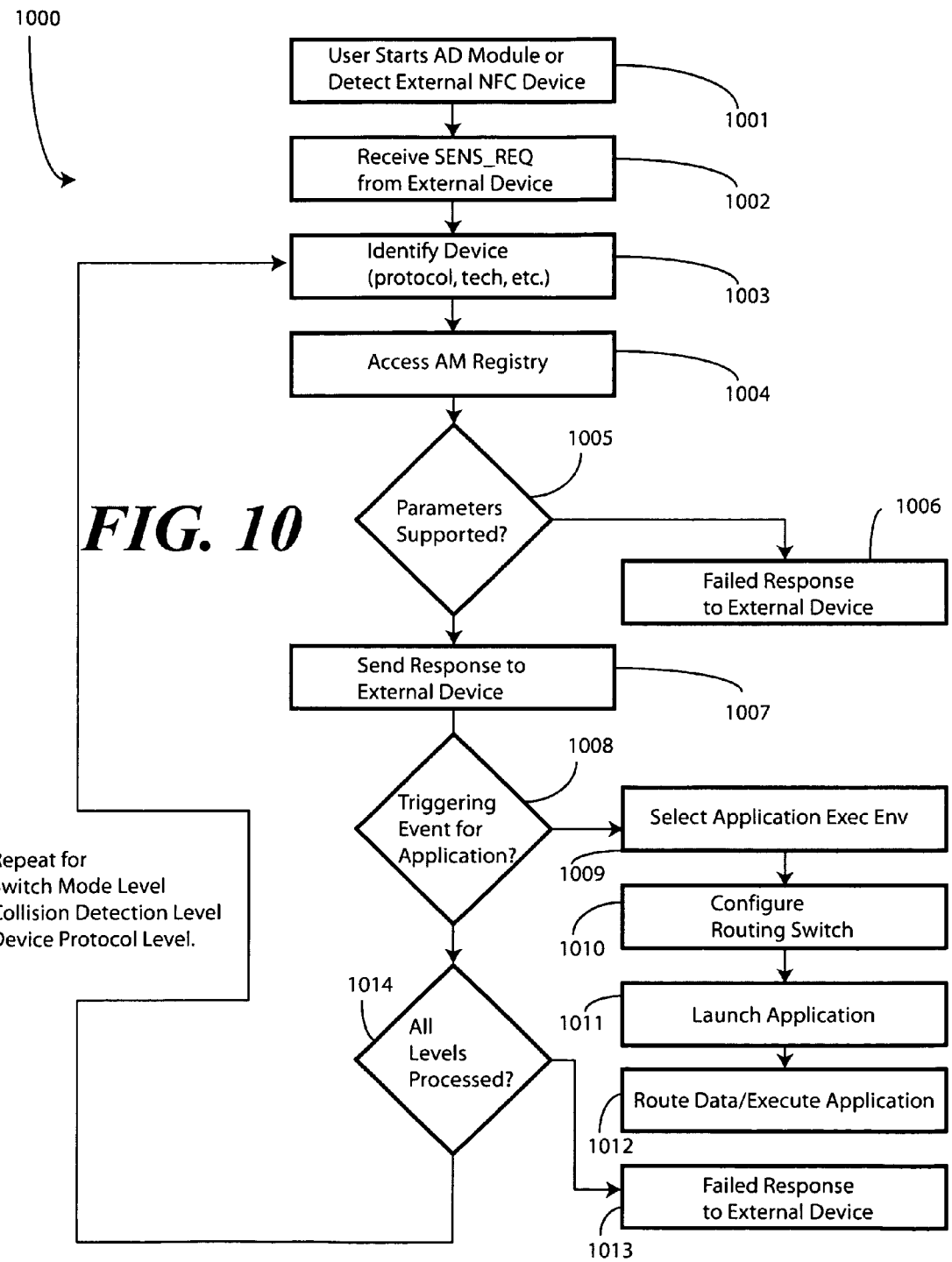
FIG. 10 illustrates a method for use with a near field communication circuit controller in accordance with embodiments of the invention.

As has been noted above, the near field communication circuit controller (301) is one of the components that can be used to execute methods in accordance with embodiments of the invention. Turning now to FIG. 10, illustrated therein is one method 1000 suitable for coding as executable code for the near field communication circuit controller (301) in accordance with the invention.

At step 1001, the near field communication circuit (216) detects the presence of an external near field communication device. Alternatively, the user may enable the application discovery feature or the near field communication circuit proactively. This detection/activation enables the near field communication circuit (216) to begin communication with the external near field communication device.

At step 1002, near field communication circuit (216) receives a SENS_REQ command from the external near field communication device. From this communication, the near field communication circuit controller (301), through its protocol discovery manager (319), identifies a near field communication technology at a protocol level, a technology level, and an anticollision level at step 1003. The near field communication circuit controller (301), in one embodiment, is capable of communication with a wide variety of near field communication technologies and devices. The near field communication circuit controller (301) accomplishes this by emulating a single near field communication circuit interface when communicating with remote near field communication devices. The near field communication circuit controller (301) operating in concert with the protocol discovery manager (319) at the various levels (322,323) of the protocol stack, identifies the near field communication technology.

At step 1004, the protocol discovery manager (319) accesses its registry to determine whether parameters of enabled applications that correspond with the near field communication technology exist. Where the parameters are supported, as determined at decision 1005, the process moves to step 1007. Where there are no parameters corresponding to the near field communication technology, which is indicative of the fact that no compatible near field communication applications exist, the process terminates at step 1006. The termination process can include the transmission of a failure response.

At step 1007, the near field communication circuit (216) transmits a response to the external near field communication device. This response can include a list of enabled applications that correspond to the near field communication technology. Alternatively, this communication can include a selected near field communication application.

At decision 1008, the near field communication circuit detects a triggering event. Such a triggering event can include a confirmation message being received from the external near field communication device. For instance, where the response sent at step 1007 indicated a selection of potentially compatible near field communication applications, the external near field communication device may respond with a particular selection, which would constitute a triggering event.

Where no triggering event is detected at decision 1008, the identification and selection process continues at the next level. For instance, while the identification and selection process may initially have been at the switch mode level, and may repeat at the collision detection level, and so forth. Where all levels are processed and no triggering event has occurred, as detected at decision 1014, the near field communication circuit (216) returns a failed response to the external device at step 1013.

At step 1009, where a triggering event has occurred, the near field communication circuit controller (301) selects and enables the execution environment in which the selected near field communication application resides. The selected execution environment has an application discovery manager (311) and registry table (318) stored therein.

At step 1011, the near field communication circuit (216), operating in conjunction with the protocol discovery manager (319) configures the routing switch (219) for communication with the selected execution environment. At step 1011, the selected near field communication application is launched. While the transaction of the selected near field communication application is processing, data is routed to the selected near field communication application and its execution environment at step 1012.

Note that the step 1011 of launching can be partitioned between the application discovery process and the execution environment in which the selected near field communication application resides. This partitioning can depend on the type of application, design preferences in allocation of applications throughout the execution environments, specific implementation partitioning of the near field communication application stack, and so forth. Each application in each execution environment can rely on processing of all protocol levels at the near field communication circuit controller. Application execution within each execution environment can be started, for example, after the mode switch level from the next three upper levels. As such, the mode switch level of execution may be partitioned into the application discovery mechanism (e.g., the protocol discovery manager or the application discovery manager), while the upper levels of execution may be partitioned into the execution environment.

The routing flag from the registry can be used to determine this execution partitioning. For example, where the routing flag is in a true state, which corresponds to a particular parameter of the application level selection process, this can signal the application discovery module to route data to the execution environment where the remaining partition of the execution process is allocated.

Figure 11:
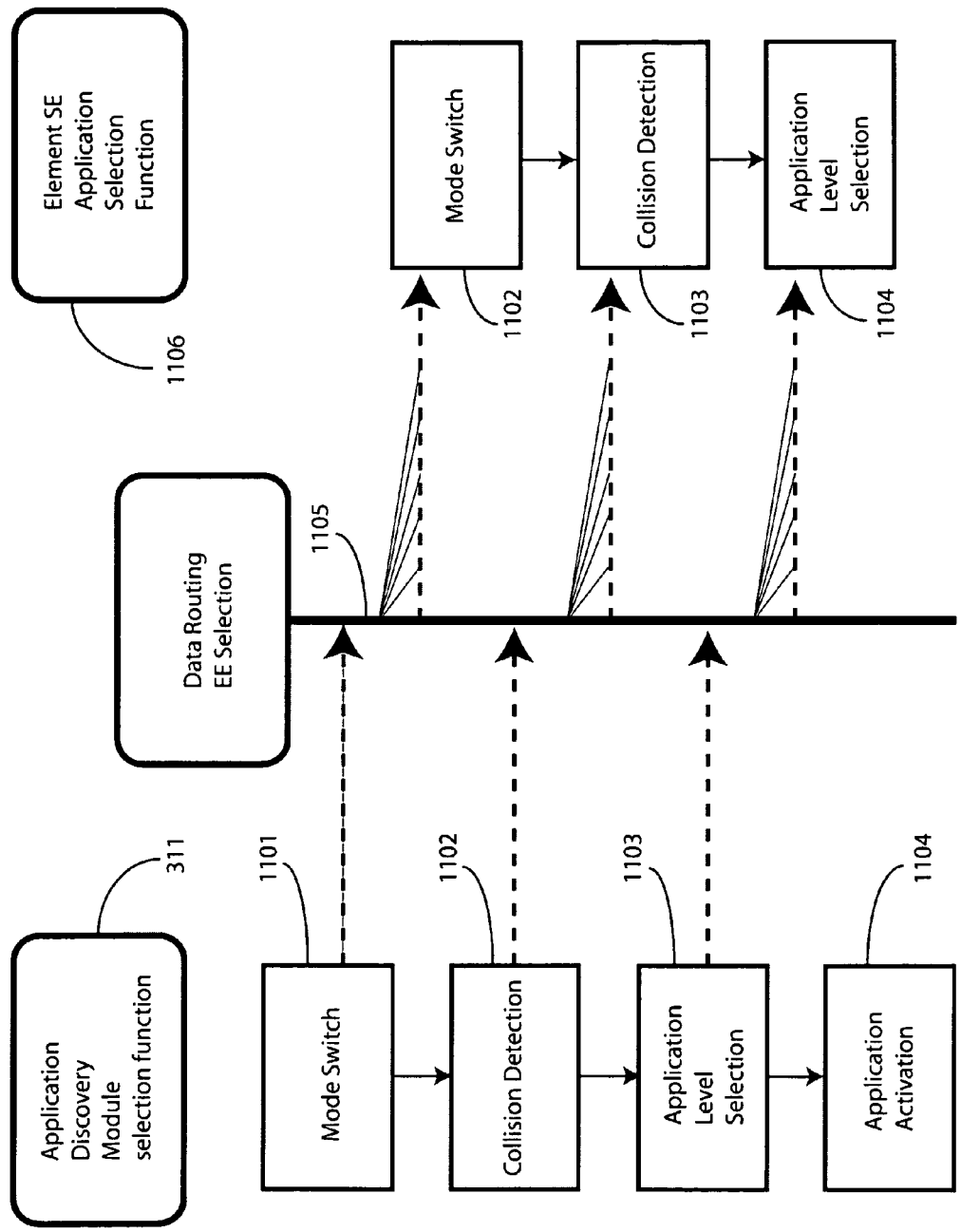
FIG. 11 illustrates one configuration for partitioning application processing between an application discovery manager and a secure environment in accordance with embodiments of the invention.

Note that different levels of application discovery can be allocated to different devices within the overall system. For instance, some levels of application discovery can be allocated to the application discovery manager, while others can be allocated to other execution environments. Turning now to FIG. 11, illustrated therein is one configuration for partitioning of application processing between the application discovery manager and the various execution environments in accordance with embodiments of the invention.

The allocation of the levels of application discovery can be allocated based upon various criteria, including the applications themselves, portable electronic device implementation or configuration, or partitioning of the near field communication circuit controller stack. Each near field communication application, and its corresponding execution environment can rely upon processing of each protocol level at the near field communication controller. Alternatively, each application can include the collision detection level within the execution environment in which the application resides.

Application execution with each execution environment can be started after the mode switch level 1101 from upper levels. These upper levels include the collision detection level 1102, the application selection level 1103, and the application activation level 1104. In one embodiment, the lower level of selection, such as the mode switch level 1101, occurs in the application discovery manager 311, while the higher levels of discovery take place in the various execution environments 1106.

The application routing event, which can correspond to a parameter associated with the application selection level 1103, signals the application discovery manager 311 to route data to a particular interface, as is illustrated at line 1105. The particular interface can be selected by the near field communication circuit controller based upon, for instance, an element identifier from the application registry table (313).

Single routing events can occur at the application registry table (313), and correspond to one selection level. The application registry table (313) may also be populated for selection levels below and equal to the level of event routing. For example, the application registry table (313) may include data corresponding to other application selection levels, required parameters, routing to other execution environments, or processing steps that occur within an application within an execution environment and that are to be skipped from the parameters stored in the registry associated with the application manager or application discovery manager.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. In a portable electronic device having near field communication capabilities and a plurality of near field communication applications, each being stored in one of a plurality of execution environments, a method for automatically selecting and launching one or more near field communication applications comprising the steps of:
   receiving a near field communication device request and identifying at least a near field communication technology, a communication protocol, and an application identifier associated therewith;
   referencing a registry table comprising identification parameters associated with the plurality of near field communication applications and that correspond to the near field communication device request;
   selecting at least one near field communication application based upon the identification parameters;
   launching the at least one near field communication application; and
   directing data communication from the near field communication device through a near field communication interface to a selected execution environment associated with the at least on near field communication application.

2. The method of claim 1, further comprising the steps of:
   configuring a switch to route data between a near field communication interface and the selected execution environment;
   presenting the at least one near field communication application to a user; and
   upon receiving a selection signal from the user, routing data between the near field communication interface and the selected execution environment.

3. The method of claim 1, wherein the plurality of execution environments comprise a plurality of secure elements, further comprising the step of determining within which execution environment the at least one near field communication application resides.

4. The method of claim 1, further comprising the step of determining a routing flag associated with a sufficiency of identification of an application based upon a corresponding discovery level the at least one near field communication application in a true state, wherein the step of directing data communication comprises directing data in accordance with the routing flag.

5. The method of claim 1, further comprising one of the step of entering a listening mode or the step of entering a polling mode prior to the step of detecting the near field communication device.

6. The method of claim 1, wherein the identification parameters comprise both application level parameters and protocol level parameters, wherein the step of selecting the at least one near field communication application comprises sequentially referencing the protocol level parameters and the application level parameters upon identifying the communication protocol and the application identifier.

7. The method of claim 1, wherein the step of selecting the at least one near field communication application comprises selecting the at least one near field communication application by one of:
- an application technology associated with the at least one near field communication application that is compatible with the near field communication device;
- an application protocol supported by the portable electronic device that corresponds to the near field communication device;
- an application identification corresponding to the near field communication device; or
- an application platform corresponding to the near field communication device.

8. A portable electronic device, comprising:
- a near field communication circuit having a single near field communication interface and a near field communication circuit controller configured to facilitate near field communication of the near field communication circuit;
- a plurality of near field communication applications, operable with the near field communication circuit controller, each application being stored within one of a plurality of execution environments;
- an application discovery manager, operable with the near field communication circuit, and configured to identify a near field communication technology, a data protocol, and an application identifier associated with a near field communication device; and
- a registry table, stored in a memory of the portable electronic device and accessible by the application discovery manager, comprising a plurality identification parameters corresponding to a plurality of detection levels and associated with the plurality of near field communication applications, wherein the plurality of identification parameters comprise at least an identifier for each of the plurality of near field communication applications of an execution environment in which each application is stored;
- wherein the application discovery manager is configured to automatically select and launch at least one near field communication application by referencing the registry table for the identification parameters corresponding to at least one of the near field communication technology, the data protocol, or the application identifier.

9. The portable electronic device of claim 8, further comprising an application manager configured to download an enabled application registry to the application discovery manager.

10. The portable electronic device of claim 9, wherein the application manager is further configured to configure the near field circuit controller to route data between the near field communication circuit and one or more of the plurality of execution environments.

11. The portable electronic device of claim 8, wherein the application discovery manager is further configured to enable the at least one near field communication application based upon the identification parameters.

12. The portable electronic device of claim 8, wherein the plurality of execution environments comprise a plurality of physical secure elements, further wherein the plurality of execution environments are each selected from the group consisting of SIM cards, memory cards, and operable modules embedded within the portable electronic device.

13. The portable electronic device of claim 12, further comprising a interface switch, operable with the near field communication circuit controller, configured to direct data between the near field communication circuit controller and at least one execution environment corresponding to the at least one near field communication application.

14. The portable electronic device of claim 13, wherein the registry table further comprises at least one routing flag corresponding to each of the plurality of near field communication applications, wherein the interface switch employs the at least one routing flag for data flow between the near field communication circuit controller and the at least one execution environment when the at least one routing flag is in a true state.

15. The portable electronic device of claim 14, wherein the at least one routing flag comprises a plurality of routing flags, with each of the plurality of routing flags being arranged according to discovery levels on a one-to-one basis, wherein a true state of a routing flag signals a sufficiency of discovery, wherein when one of the plurality of routing flags is detected to be in a true state, the application discovery manager is configured to transfer a near field communication transaction to the at least one execution environment for further processing.

16. The portable electronic device of claim 14, wherein the near field communication circuit further comprises a plurality of interfaces associated with the plurality of execution environments, the plurality of interfaces comprising a peripheral interface, a host interface, and a near field communication interface, wherein the application discovery manager directs data with the at least one execution environment through one of the peripheral interface, the host interface, or the near field communication interface.

17. The portable electronic device of claim 8, wherein the identification parameters are grouped according to discovery levels used by the application discovery manager, wherein the discovery levels include at least a protocol level and an application level.

18. The portable electronic device of claim 17, wherein the identification parameters of the protocol level comprise mode switch activity parameters, collision detection activity parameters, or device activation activity parameters, further wherein the identification parameters of the application level comprise at least one of collision detection parameters or application selection parameters, the application selection parameters comprising identification numbers corresponding to execution environments in which the at least one near field communication application resides.

19. The portable electronic device of claim 8, wherein the near field communication applications comprise electronic wallet applications.

20. The portable electronic device of claim 8, wherein the portable electronic device comprises a mobile telephone.

* * * * *